United States Patent [19]

Takata et al.

[11] Patent Number: 5,109,886
[45] Date of Patent: May 5, 1992

[54] FLUID PRESSURE CONTROLLER

[75] Inventors: Koji Takata; Koichi Hashida, both of Itami, Japan

[73] Assignee: Sumitomo Electric Industries, Osaka, Japan

[21] Appl. No.: 653,223

[22] Filed: Feb. 8, 1991

[30] Foreign Application Priority Data

Feb. 9, 1990 [JP] Japan .................................. 2-29827

[51] Int. Cl.⁵ .......................................... F15B 13/044
[52] U.S. Cl. ........................... 137/596.17; 137/625.65; 303/119 SV
[58] Field of Search ....................... 137/596.17, 625.65; 303/119 SV

[56] References Cited

U.S. PATENT DOCUMENTS 5,018,797 5/1991 Takata ........................ 251/129.15 X

FOREIGN PATENT DOCUMENTS 211409 9/1988 Japan ................................ 137/625.65

3-90462 4/1991 Japan .

Primary Examiner—Gerald A. Michalsky
Attorney, Agent, or Firm—Wenderoth, Lind & Ponack

[57] ABSTRACT

A fluid pressure controller has a houisng including an input port, a discharge port and an output port, and a spool is axially slidably mounted in the housing. First and second chambers are defined at opposing ends of the spool by the spool and the housing. Ring valve members are mounted on the spool at axial spaced locations to define oppositely oriented variable-size orifices for pressure increase and pressure reduction. They are adapted to separately control communications between the first chamber and the input port and between the first chamber and the discharge port depending upon the axial position of the spool and to close both communications when the spool is in its closed position. Thus the pressure controller can be freely changed between providing pressure increase, pressure reduction and pressure hold.

12 Claims, 2 Drawing Sheets

FLUID PRESSURE CONTROLLER

BACKGROUND OF THE INVENTION

This invention relates to a fluid pressure controller suitable for use in a high-pressure, small-flow fluid pressure system such as a brake system for a vehicle, and more specifically to a device for controlling the rate of increase or decrease of the pressure (speed or in a strict sense, the rate of increase or decrease of the flow velocity) on the base of a value corresponding to the magnitude of an electric command.

The present applicant has proposed a variable flow control valve in Japanese Patent Application 1-272628. With this prior art variable flow control valve, a differential pressure corresponding to the magnitude of an electric command is produced between first and second fluid chambers formed at opposing ends of a spool through a variable-size orifice defined by a shoulder portion of the spool. The flow through the valve is controlled by a fixed-size orifice formed in a passage connecting both chambers so as to correspond to the differential pressure.

In order to use this valve for a variety of applications, two of such valves have to be prepared, one for pressure increase and the other for pressure reduction. This is inconvenient and uneconomical.

SUMMARY OF THE INVENTION

It is an object of this invention to provide a variable-flow fluid pressure controller which can be used both for pressure increase and pressure reduction.

According to this invention, two axially spaced apart ring valve members are provided on the spool for differential pressure control between the first and second chambers. Variable-size orifices are defined by the respective ring valve members and shoulders on the spool and are oriented in opposite directions relative to one another.

One of the problems with such a valve is the difficulty in machining and assembly. Namely, if two ring valve members are provided at two axially displaced locations, it is necessary to provide two spool guide portions to guide the spool axially while substantially maintaining liquid-tightness. A high tolerance is required for the cylindricity of the guide portions. Thus if the spool is an integral body, it also has to have a high cylindricity at the portions where it passes through the guide portions. Such a spool would be extremely difficult to machine.

In order to solve this problem, according to this invention, the spool is divided into two portions, one for pressure increase and the other for pressure reduction, so that each spool section is guided by each of the two slide guide portions.

The variable-size orifices formed by the ring valve members serve to separately control communications between the first chamber and the input port and between the first chamber and the discharge port according to the axial position of the spool. When both of them are in a closed position, both communications are closed. Thus, the controller according to this invention provides a three-phase control, that is, pressure increase, pressure reduction and pressure hold. Thus, it can be used for various applications.

Further, since the spool is axially divided into two sections, the cylindricity tolerances of the respective guide portions can be determined separately from each other. In other words, it is not necessary to take into account the cylindricity tolerance between the two guide portions. Such spools can be manufactured and assembled more easily.

According to this invention, pressure increase, pressure reduction and pressure hold controls are carried out by use of ring valve members which are advantageous in keeping liquid-tightness. Thus such a controller can be used for brake systems having multiple functions.

BRIEF DESCRIPTION OF THE DRAWINGS

Other features and objects of the present invention will become apparent from the following description taken with reference to the accompanying drawings, in which.

DETAILED DESCRIPTION OF THE INVENTION

Figure 1:
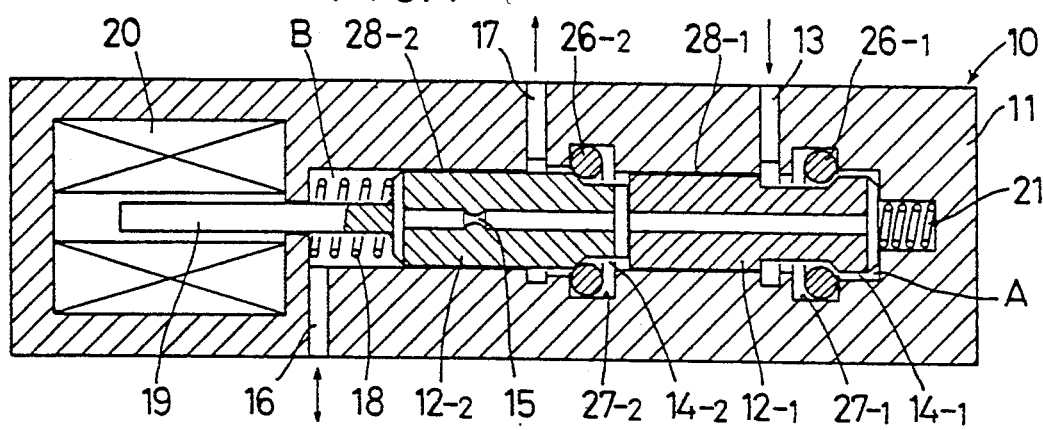
FIG. 1 is a schematic sectional view of one embodiment of this invention.

In FIG. 1, a fluid pressure controller 10 comprises a housing 11 having an input port 13, a discharge port 17 and an output port 16, and a spool 12 axially movably mounted in the housing 11. The spool shown in the figure is divided into two portions 12-1 and 12-2 for easy machining and workability. But from a functional viewpoint, it may be a unitary body.

The two portions have their ends abutting with each other. A first chamber A is defined between one end of the spool 12 and the housing 11 whereas a second chamber B is defined between the outer end of the spool 12 and the housing. The second chamber B communicates with the output port 16. The spool 12-1 near the chamber A is formed with an internal passage such that both ends of the spool communicate with one another, whereas the spool 12-2 near the chamber B is formed with an internal passage having a fixed-size orifice 15 such that both ends thereof communicate with one another.

Further, peripheral passages 14-1 and 14-2 are formed in the outer peripheral surfaces of the spools, 12-1 and 12-2, respectively. The passage 14-1 communicates with the internal passage through a hole formed near the first chamber A, whereas the passage 14-2 communicates with the internal passage through a hole formed near the abutting ends of the spools 12-1 and 12-2 or through a groove formed in the abutting ends of the spools.

Ring valve members 26-1 and 26-2 are provided in the housing 11 on the spools. Between the ring valve members and shoulders formed on the spools, variable-size orifices are formed to control communication between the peripheral passages 14-1 and 14-2 and the input port 13 and the discharge port 17.

The two variable-size orifices defined by the ring valve members and the shoulders on the spools are oriented in opposite directions to each other and disposed so that they can have a position where both of them are closed. Namely, at the pressure increase side, the variable-size orifice defined by the ring valve member 26-1 is located at a side of the groove 27-1 away from the input port 13, while at the pressure reduction side, the variable-size orifice defined by the ring valve member 26-2 is located at a side of the groove 27-2 near the discharge port 17.

Therefore, when the spool 12 moves toward the first chamber A, the variable-size orifice at the input port will open, thus increasing the pressure. When it moves toward the second chamber B, the variable-size orifice at the discharge part 17 will open, thus reducing the pressure. The ring valve members 26 have not only the function of defining the variable-size orifices but also the function of sealing grooves 27 formed in the housing 11. Further, the ring valve members 26 serve to permit an overstroke of the spool in order to allow another spool to open the port after the variable-size orifices have been closed. The ring valve members should preferably be made of an elastic material for easy manufacture and assembly. But they may be made of a rigid material depending upon the design of the housing. In the embodiment, simple O-rings are used. But members such as lip seals may be used.

Spool guide portions 28-1 and 28-2 having very narrow clearances are formed in the housing to prevent the hydraulic fluid from flowing other than through the variable-size orifices, and to allow the spool to slide axially while maintaining liquid-tightness.

When using the divided spool, in order to make the most of its merit, the spool guide portions 28-1 and 28-2 should be formed on separate members, which are then assembled together to form the housing 11. As long as this requirement is satisfied, the housing may be divided in any desired way. Actually, the housing is made of a plurality of separate members for convenience of manufacture.

In the housing 11, there are provided an electricity/power convertor 20 for driving the spool, a spring 18 for maintaining the spool in its initial position when the output of the electricity/power convertor 20 is zero, and a spring 21 for urging the spool 12-1 toward the spool 12-2 when the latter moves to the lefthand side of the figure.

The spring force exerted on the spool may be adjusted e.g. by use of adjusting means as disclosed in Japanese Patent Application 1-272628.

The flow rate through the controller 10 is determined by the pressure differential between opposite sides of the fixed-size orifice 15, i.e. the differential in pressure between the chambers A and B. It is also determined by the difference between the output of the electricity/power convertor 20 and the spring force which opposes this output the force which results from subtracting the force of spring 21 from the force of spring 18).

The spool 12 will move automatically so as to maintain the fluid pressure differential between opposite sides of the fixed-size orifice to adjust the degree of opening of the variable-size orifices defined by the ring valve members 26 and the shoulders on the spool between the input port 13 and the peripheral passage 14-1 and between the peripheral passage 14-2 and the discharge port 17. Namely, when the variable-size orifice is formed between one of the spools and the ring valve member, the other spool is in a state of overstroke and in contact with the respective ring valve member liquid-tightly. Thus, both in the pressure increase control and pressure reduction control, the flow rate can be controlled to an amount corresponding to the magnitude of electric command given to the electricity/power convertor 20.

According to this invention, the initial position of the controller (when it is not activated) can be set at any one of the following three, i.e. position for pressure increase, the position for pressure hold (both closed) and the position for pressure reduction, by adjusting the arrangement of the spool 18 and the arrangement and properties of the electricity/power convertor 20.

Figure 2:
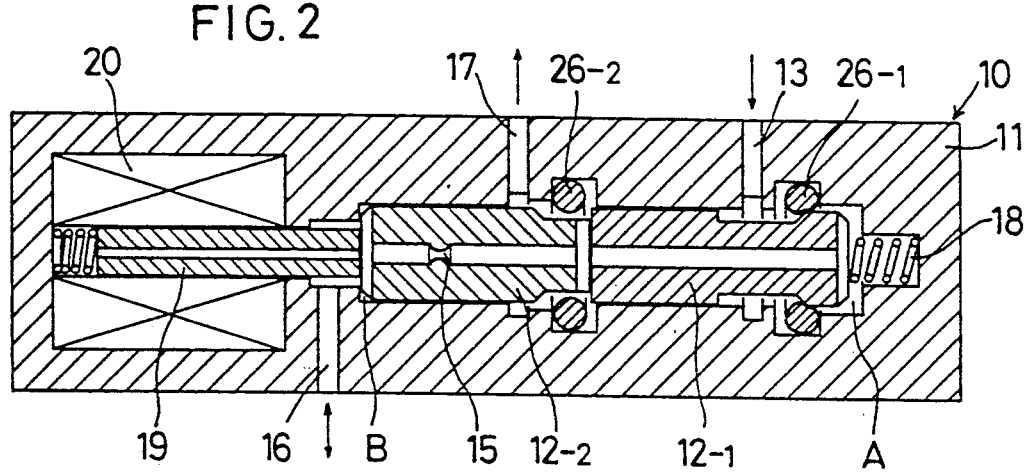
FIGS. 2-5 are schematic sectional views of other embodiments.
Figure 3:
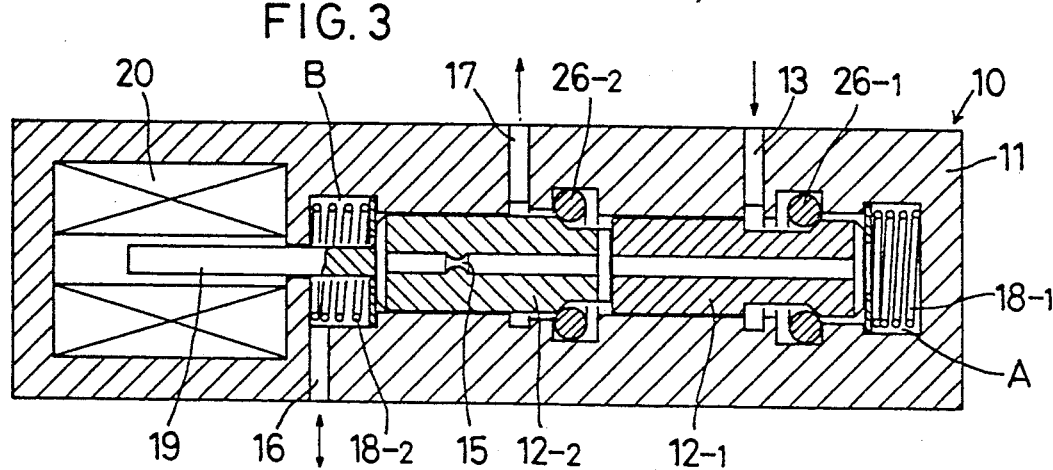

For example, in the arrangement of FIG. 1 in which the spool is located at the end of its travel toward the chamber A when not activated, the initial position is the position for pressure increase. In the arrangement of FIG. 2 in which the spool is located at the end of its travel toward the chamber B when not activated, the initial position is the position for pressure reduction. In FIG. 3 where the spool is in an intermediate position of stroke when not activated, the initial position is the position for pressure hold.

When the initial position corresponds to the position for pressure increase or pressure reduction, the force of the spring 18 minus that of the spring 21 preferably corresponds to a medium level of the output of the electricity/power convertor 20 of the type which operates in a single direction (a pull-in type is shown in FIG. 1 while a push-out type is shown in FIG. 2), so that the pressure hold state is attained when the output is at a medium level. On the other hand, when the initial position is the position for pressure hold, as in the embodiment of FIG. 3, two weak springs are provided so as oppose to each other, and an electricity/power convertor 20 which works in both directions is used.

A driver 19 of the electricity/power convertor 20 is integral with the spool 12-2 in the embodiments of FIGS. 1 and 3. But as shown in FIG. 2, or as shown in FIG. 4 in which the converter 20 is located at a side opposite to that shown in FIG. 2, the driver 19 may be formed as a separate member having its own guide surface.

Figure 4:
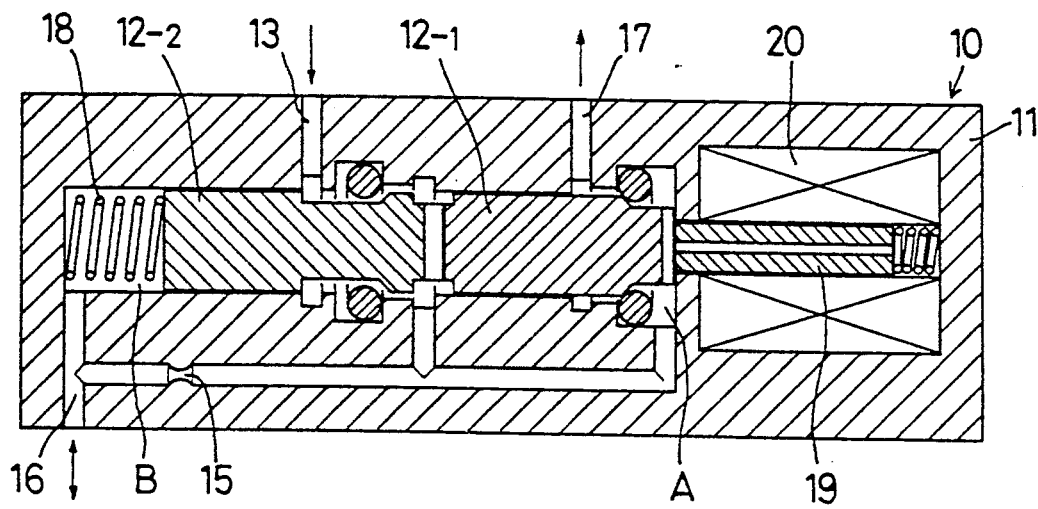
Figure 5:
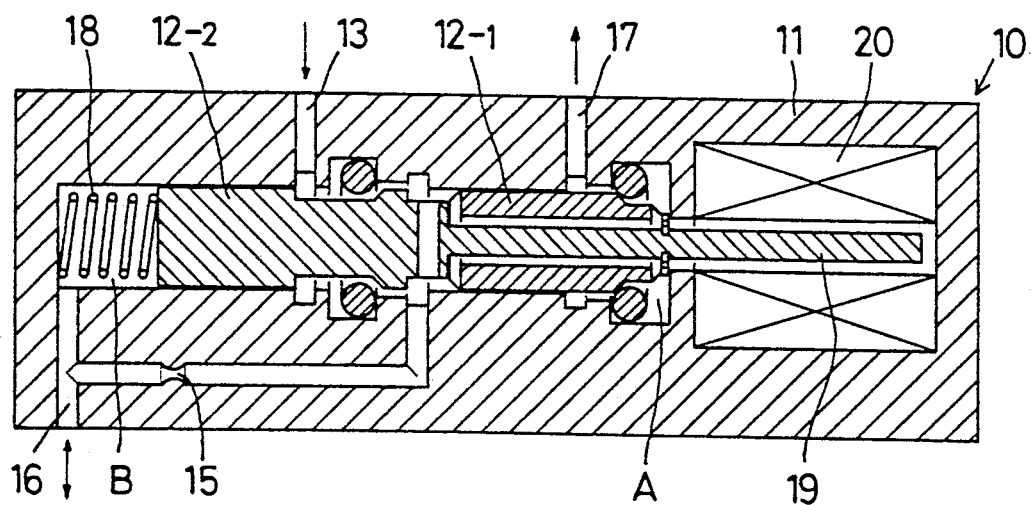

As shown in FIGS. 4 and 5, the input port and the discharge port may be provided so that their relative positions with respect to the chambers A and B will be opposite to the relation shown in FIGS. 1–3. But in such a case, if the initial position when not activated is set to the position for pressure hold, arrangements will be necessary to impart a pushing force to one of the two spools and a pulling force to the other by means of the electricity/power converter. One example is shown in FIG. 5 in which a driver 19 integral with the spool 12-2 extends through the spool 12-1 with a diametrical play to mechanically couple the spools 12-1 and 12-2 together through the driver 19.

The passage for fluid communication between the chambers A and B should be formed through the spool for ease of machining. But as shown in FIG. 4, such a passage and the fixed-size orifice 15 may be formed outside the spool. In the embodiment of FIG. 5, part of the passage for communication is formed in the spool 12-1 while its remainder is formed in the housing together with the fixed-size orifice.

Other conventional means may be employed, such as circumferential grooves formed in the surface of the spool to reduce frictional resistance.

What is claimed is:

1. A fluid pressure controller comprising:
   a housing having an input port, a discharge port and an output port;
   a spool axially slidably mounted in said housing and including a pair of shoulders;
   first and second chambers defined at opposing ends of said spool, respectively, between said spool and said housing;

an electricity/power converter means for imparting to said spool an axial driving force corresponding to the magnitude of an electric command;

a spring means for holding said spool in an initial position when no axial driving force is imparted to said spool by said electricity/power converter means;

a pressure increase valve ring member mounted about said spool and defining, with one of said shoulders of said spool, a pressure increase variable-size orifice;

a pressure reduction valve ring member mounted about said spool and defining, with the other of said shoulders of said spool, a pressure reduction variable-size orifice which is oriented in a direction opposite to a direction in which said pressure increase variable-size orifice is oriented, said pressure increase and pressure reduction variable-size orifices being adapted to separately control communication between said first chamber and said input port and communication between said first chamber and said discharge port depending upon the axial position of said spool;

two guide portions for guiding said spool, one of said guide portions being located on a side of said input part opposite said pressure increase ring valve member the other of said guide portions being located on a side of said discharge port opposite said pressure reduction ring valve member;

a first passage means for normally maintaining said second chamber in communication with said output port;

a second passage means for normally maintaining said first chamber and said second chamber in communication with one another; and a fixed-size orifice formed in said second passage means;

whereby a pressure differential between said first and second chambers and across said pressure increase and pressure reduction variable-size orifices can be generated, the pressure differential corresponding to the axial force applied to said spool by said electricity/power converter means.

2. A fluid pressure controller as claimed in claim 1, wherein said spool is divided into two spool portions including a pressure increase spool and a pressure reduction spool, said spool portions being guided separately by said two guide portions.

3. A fluid pressure controller as claimed in 2, wherein said pressure increase spool is located at the side of said first chamber and has both ends thereof in communication with said first chamber, and wherein said pressure reduction spool is located at the side of said second chamber and has one end thereof in abutment with said pressure increase spool and in communication said first chamber and the other end in communication with said second chamber, said fixed-size orifice being formed in a passage which connects opposing ends of said pressure reduction spool in communication with one another.

4. A fluid pressure controller as claimed in claim 2, wherein said initial position of said spool is a position for pressure increase in which said input port is in communication with said first chamber through said pressure increase variable-size orifice.

5. A fluid pressure controller as claimed in claim 2, wherein said initial position of said spool is a position for pressure hold in which both said pressure increase and said pressure reduction variable-size orifices are closed.

6. A fluid pressure controller as claimed in claim 2, wherein said initial position of said spool is a position for pressure reduction in which said discharge port is in communication with said first chamber through said pressure reduction variable-size orifice.

7. A fluid pressure controller as claimed in claim 1, wherein said initial position of said spool is a position for pressure increase in which said input port is in communication with said first chamber through said pressure increase variable-size orifice.

8. A fluid pressure controller as claimed in claim 7, wherein said spool is divided into two spool portions, including a pressure increase spool and a pressure reduction spool, and wherein said pressure increase spool is located at the side of said first chamber and has both ends thereof in communication with said first chamber, and wherein said pressure reduction spool is located at the side of said second chamber and has one end thereof in abutment with said pressure increase spool and in communication said first chamber and the other end in communication with said second chamber, said fixed-size orifice being formed in a passage which connects opposing ends of said pressure reduction spool in communication with one another.

9. A fluid pressure controller as claimed in claim 1, wherein said initial position of said spool is a position for pressure hold in which both said pressure increase and said pressure reduction variable-size orifices are closed.

10. A fluid pressure controller as claimed in claim 9, wherein said spool is divided into two spool portions, including a pressure increase spool and a pressure reduction spool, and wherein said pressure increase spool is located at the side of said first chamber and has both ends thereof in communication with said first chamber, and wherein said pressure reduction spool is located at the side of said second chamber and has one end thereof in abutment with said pressure increase spool and in communication said first chamber and the other end in communication with said second chamber, said fixed-size orifice being formed in a passage which connects opposing ends of said pressure reduction spool in communication with one another.

11. A fluid pressure controller as claimed in claim 1, wherein said initial position of said spool is a position for pressure reduction in which said discharge port is in communication with said first chamber through said pressure reduction variable-size orifice.

12. A fluid pressure controller as claimed in claim 11, wherein said spool is divided into two spool portions, including a pressure increase spool and a pressure reduction spool, and wherein said pressure increase spool is located at the side of said first chamber and has both ends thereof in communication with said first chamber, and wherein said pressure reduction spool is located at the side of said second chamber and has one end thereof in abutment with said pressure increase spool and in communication said first chamber and the other end in communication with said second chamber, said fixed-size orifice being formed in a passage which connects opposing ends of said pressure reduction spool in communication with one another.

* * * * *